Figure 1:
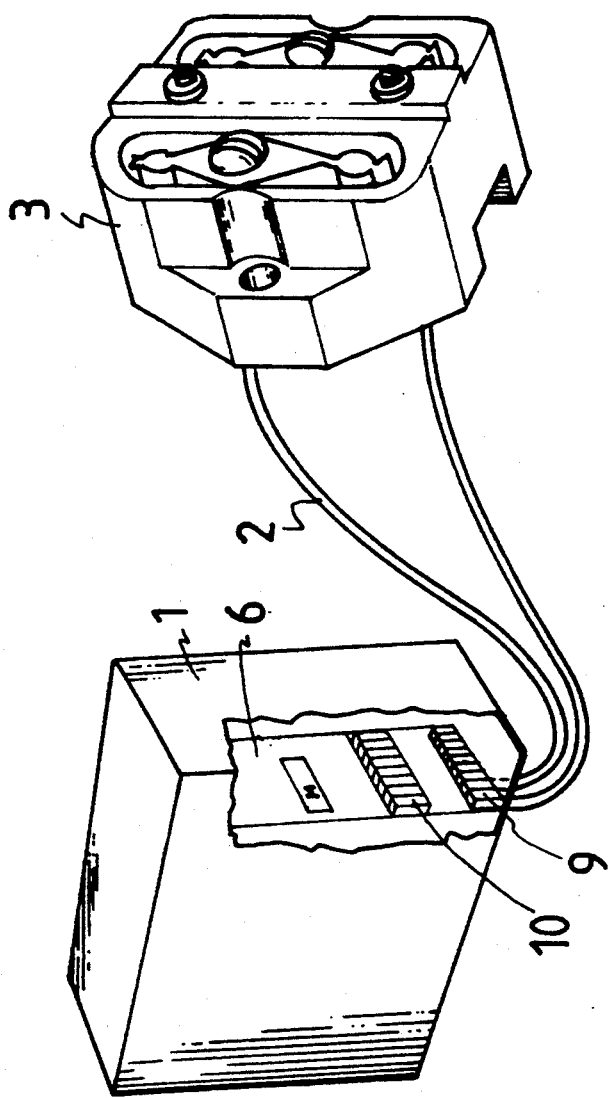

United States Patent [19]

Salo

[11] Patent Number: 5,406,191
[45] Date of Patent: Apr. 11, 1995

[54] PROCEDURE AND APPARATUS FOR THE CONTROL OF ELECTRIC POWER

[75] Inventor: Olli Salo, Helsinki, Finland

[73] Assignee: Smart Set Oy, Espoo, Finland

[21] Appl. No.: 173,253

[22] Filed: Dec. 27, 1993

Related U.S. Application Data

[63] Continuation of Ser. No. 613,580, Jan. 29, 1991, abandoned.

[30] Foreign Application Priority Data

Jun. 23, 1988 [FI] Finland ................................ 883024

[51] Int. Cl.6 ............................................. G05F 1/40
[52] U.S. Cl. .................................... 323/320; 323/324; 323/221; 323/902; 323/905; 363/146
[58] Field of Search ............... 323/320, 902, 324, 221, 323/235, 239, 905; 363/146

[56] References Cited

U.S. PATENT DOCUMENTS

| | | | |
|---|---|---|---|
| 3,931,514 | 1/1976 | Patterson | 250/206 |
| 4,249,794 | 2/1981 | Haley | 350/96.20 |
| 4,339,670 | 7/1982 | Guajardo | 307/252 A |
| 4,649,323 | 3/1987 | Pearlman et al. | 315/307 |

FOREIGN PATENT DOCUMENTS

0247874A2 12/1987 European Pat. Off. .
2115994 9/1983 United Kingdom .

Primary Examiner—Steven L. Stephan
Assistant Examiner—Adolf Berhane
Attorney, Agent, or Firm—Armstrong, Westerman, Hattori, McLeland & Naughton

[57] ABSTRACT

Procedure and apparatus for the control of electric power, by which procedure the electric power supplied to a load is regulated by means of a regulator, e.g. a thyristor regulator. The regulator control signals, e.g. thyristor firing pulses, are produced by a separate control unit (6), from where they are passed in the form of optical signals via at least one optical fibre (2) to a socket or equivalent and further to a photosensitive device (Q), which converts the signals into electrical form and applies them to at least one controllable solid-state component, e.g. thyristor, in the power stage of the regulator.

6 Claims, 2 Drawing Sheets

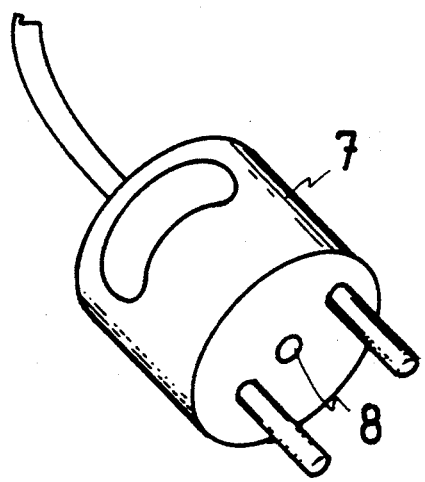
Fig. 2
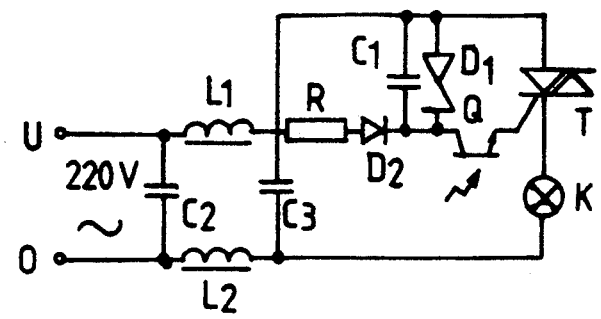
Fig. 3
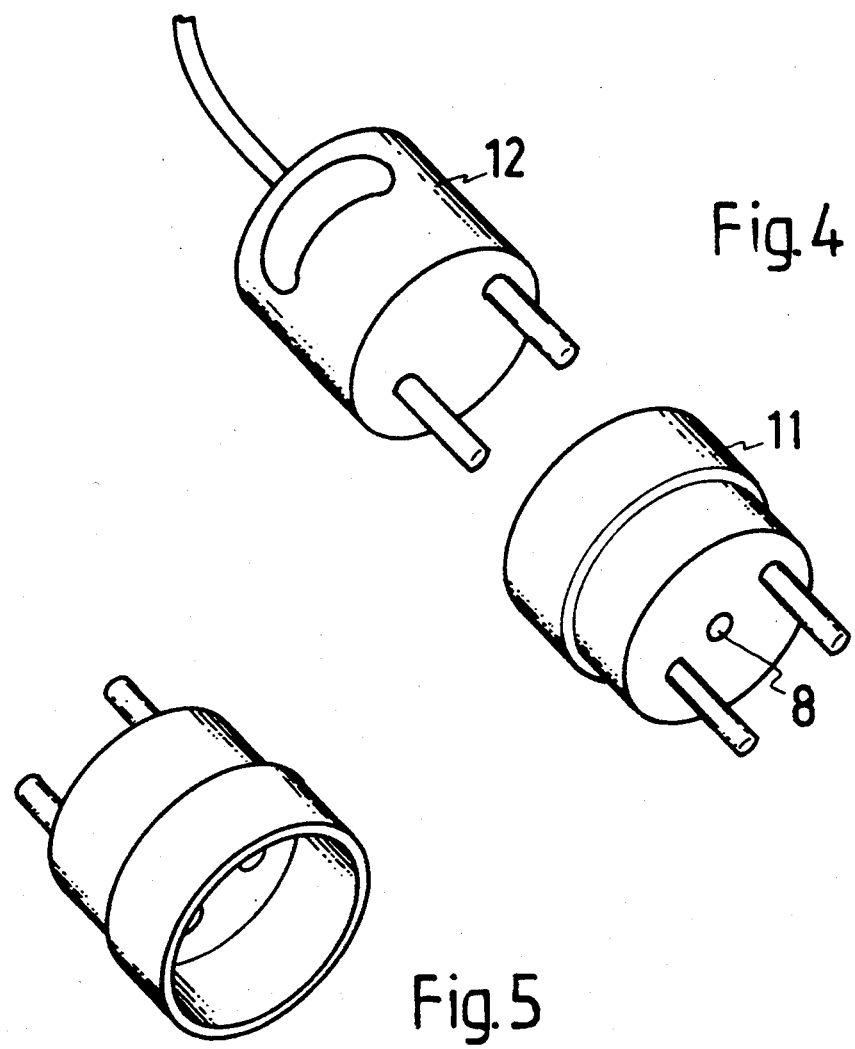
Fig. 4
Fig. 5

PROCEDURE AND APPARATUS FOR THE CONTROL OF ELECTRIC POWER

This application is a Rule 62 continuation application of Ser. No. 07/613,580, filed Jan. 29, 1991, now abandoned.

The present invention relates to a procedure and an apparatus for the control of electric power, by which procedure the electric power supplied to a load is regulated by means of a regulator, e.g. a thyristor regulator.

Stepless variation of the brightness of illumination using modern thyristor techniques is based on so-called phase angle control. This means that during each half-cycle of the mains voltage, a thyristor is triggered into conduction upon the lapse of a desired delay (i.e. phase angle) after the beginning of the half-cycle. The longer the delay before triggering, the shorter the time during which power is supplied to the load, i.e. the dimmer the light produced by the lamp.

A feature of the so-called intelligent design in buildings is the possibility of individual control of each illuminator in a room. Using conventional techniques, this requires e.g. a separate control knob beside a door for each lighting fixture. If the brightness of a given illuminator is to be controlled from several locations, this necessitates the use of a microprocessor-based control unit which gathers the control data from the control knobs in different locations and controls the thyristor regulator of each illuminator in a centralized manner. If the thyristor regulators are incorporated in the control unit, then the large number of outgoing conductors becomes a problem. The conductors carry an intermittent mains current which causes radio interference, and they have to be connected to a socket specifically reserved for a given illuminator. For example a vacuum cleaner must not be plugged into such a socket, because the regulator cannot reasonably be rated for the power levels involved.

Another solution for transmitting the control data to the device to be controlled involves the use of a network, either a separate galvanic data net or an electrical network, which connects all the devices to be controlled. The control commands are fed by the controlling device into this network and received by each device. Each device checks by the device address sent along with each command whether the command concerns the particular device. Such a system necessitates the use of microprocessor-based logic circuitry in each device. Although microelectronics develops fast, it does not seem likely that this kind of logic circuitry should become cheap enough in the near future to be usable in individual lamps. Moreover, there is a limit to the transmission capacity of the network in such systems, and this may impose a restriction regarding the variety of control commands that can be handled.

The object of the present invention is to eliminate the drawbacks referred to above. The procedure of the invention is mainly characterized in that the regulator control signals, e.g. thyristor firing pulses, are produced by a separate control unit and passed in the form of optical signals via at least one optical fibre to a socket or equivalent and further to a photosensitive device, which converts the signals into electrical form and applies them to at least one controllable solid-state component, e.g. thyristor, in the power stage of the regulator.

The apparatus implementing the procedure of the invention for the control of electric power, comprising a regulator, e.g. a thyristor regulator, for varying the power supplied to the load, and a socket or a similar connector and a plug or equivalent, is mainly characterized in that the apparatus has a separate control unit producing the regulator control signals, e.g. thyristor firing pulses, at least one optical fibre carrying the control signals in optical form, and, located in the regulator, a photosensitive component to which the optical signals are transmitted via the socket or equivalent and which converts the signals into electrical form and applies them to at least one controllable solid-state component, e.g. thyristor, in the power stage of the regulator.

Compared to previously known systems, this invention is simple and functions with the least imagingable number of electronic components in the device to be controlled. Yet it allows e.g. individual control of each illuminator, including selectable dimming rates.

An essential feature of the system is that all the sockets involved are fed by the normal mains supply, and that the regulator is placed in the illuminator or other load, e.g. in its connecting plug.

In the following, the invention is described in greater detail by the aid of an example, reference being made to the attached drawings, in which FIG. 1 presents a control unit, optical-fibre cables and a wall socket.

FIG. 2 presents a plug.

FIG. 3 shows a diagram of the plug circuit.

FIG. 4 presents a plug and an adapter.

FIG. 5 shows the adapter in rear view.

FIG. 1 shows a control unit 1, two optical-fibre cables 2, each having an optical fibre inside, and a wall socket consisting of a connector part 3 and a cover 4. The cover is provided with holes 5 located in the area covered by a plug, each hole accommodating one end of an optical-fibre cable. The control unit contains a microprocessor-based controller 6 which generates trigger pulses syncronized with the phase voltage of the mains supply. These pulses are passed via the optical fibre in an optical-fibre cable to the cover of the wall socket, from where they are fed into the current regulator, which is a thyristor or triac regulator built inside the connecting plug of each illuminator. The plug 7 in FIG. 2, which is inserted into the socket, has a hole 8 so located that it comes opposite to the hole 5 in the socket cover. In the hole 8 is a phototransistor Q, which is connected to the regulator circuit as shown by the diagram in FIG. 3. The transistor converts the optical pulses back into electrical pulses, which trigger a triac T in the power stage of the regulator, e.g. a triac regulator.

In addition, the regulator circuit comprises a Zener diode D1, a capacitor C1 and a series circuit of a resistor R and a diode D2, which are all connected between the mains phase U and the collector of the transistor, and an interference suppression circuit consisting of inductance L1 in the mains phase U, inductance L2 in the neutral mains line 0 and capacitors C2 and C3 connected between the two mains lines.

The layout of the components belonging to the electrical connection of dome lamps can be such that only the phototransistor and a few other small components are placed in the socket while the rest are placed on the plate between the ceiling and the hood of the lamp anchorage.

The control unit may be a lighting control card as shown in FIG. 1. The unit has eight fibre-optic connectors 9 at its bottom edge for the fibres leading to the socket covers. In this case the unit can thus control eight illuminators. For each illuminator, the control unit has a separate phase angle counter 10, whose set value is altered by the unit's microprocessor M when the user alters the illumination brightness setting.

The plug accommodating the regulator can also be implemented as an adapter 11 connected between the socket and the plug 12 of the load as shown in FIG. 4. FIG. 5 shows the adapter in rear view.

It is obvious to a person skilled in the art that different embodiments of the invention are not restricted to the examples described above, but that they may instead be varied within the scope of the following claims. Besides an illuminator, the load may also be some other type of device, e.g. an electric heater, in which case the regulator preferably employs zero-point switching.

I claim:

1. Apparatus for the control of electric power of a load of an appliance plugged into a wall socket, comprising:

a socket for distribution of the electric power consisting of electrical contacts and a cover, the cover provided with at least one auxiliary hole;

a detachable plug connected to the load with a cord and provided with at least one auxiliary hole located so that said hole in the plug is aligned with the corresponding hole in the cover of said socket, when the plug is pushed into said socket;

a semiconductor based controller placed in said plug or adjacent to it for controlling individually the power supplied to the load from the mains supply;

a separate control unit producing control signals for said semiconductor based controller;

at least one optical fiber carrying the control signals in optical form, the fiber being connected between said separate control unit and said auxiliary hole in the cover of the socket;

a photosensitive device in said plug supplying control signals for said semiconductor based controller, the photosensitive device being located in said auxiliary hole in said plug so that the light from said fiber is exposed to said photosensitive device;

the control signals being transmitted to said photosensitive device in optical form via said optical fiber and respectively through said auxiliary holes in the socket and the plug; and wherein said semiconductor based controller is connected to said separate control unit when said detachable plug is pushed into said socket so that the control of electric power is connected simultaneously as the mains supply is connected to said load.

2. Apparatus according to claim 1, wherein the separate control unit is equipped with fiber-optic connectors for the fibers leading to the holes in the cover of the socket.

3. Microprocessor based apparatus for the control of electric power of a load according to claim 1 wherein the separate control unit is equipped with a microprocessor.

4. Apparatus according claim 1, wherein the photosensitive device supplying the control signals to at least one controllable solid state component in a power stage of the semiconductor based controller and the photosensitive device and the controllable solid state component are integrated to the plug.

5. Apparatus according to claim 4 wherein the controllable solid state component is phase angle controlled.

6. Apparatus according to claim 1, wherein the plug is an integrated part of a controller box, which controls the power supplied to the load and is equipped with an additional socket for being connected between the plug of the load and the socket.

* * * * *